(12) United States Patent
Ikeda et al.

(10) Patent No.: US 7,912,071 B2
(45) Date of Patent: Mar. 22, 2011

(54) PASSIVE OPTICAL NETWORK SYSTEM FOR SUPPORTING VIRTUAL ETHERNET SERVICE AND METHOD FOR THE SAME

(75) Inventors: Hiroki Ikeda, Hachioji (JP); Juan Wu, Beijing (CN)

(73) Assignee: Hitachi, Ltd., Tokyo (JP)

( * ) Notice: Subject to any disclaimer, the term of this patent is extended or adjusted under 35 U.S.C. 154(b) by 880 days.

(21) Appl. No.: 11/727,446

(22) Filed: Mar. 27, 2007

(65) Prior Publication Data
US 2007/0230481 A1 Oct. 4, 2007

(30) Foreign Application Priority Data
Mar. 31, 2006 (CN) .......................... 2006 1 0071069

(51) Int. Cl.
*H04L 12/56* (2006.01)
*H04L 12/28* (2006.01)
(52) U.S. Cl. .................................. 370/395.53; 370/254
(58) Field of Classification Search .................... None
See application file for complete search history.

(56) References Cited

U.S. PATENT DOCUMENTS

| 5,892,912 | A * | 4/1999 | Suzuki et al. | 370/395.53 |
|---|---|---|---|---|
| 6,873,602 | B1 * | 3/2005 | Ambe | 370/254 |
| 7,292,577 | B1 * | 11/2007 | Ginipalli et al. | 370/395.1 |
| 2003/0152075 | A1 * | 8/2003 | Hawthorne et al. | 370/389 |
| 2004/0047349 | A1 * | 3/2004 | Fujita et al. | 370/389 |
| 2004/0081171 | A1 * | 4/2004 | Finn | 370/395.53 |
| 2005/0083950 | A1 | 4/2005 | Choi et al. | |
| 2005/0180391 | A1 * | 8/2005 | Shimada | 370/351 |
| 2005/0286500 | A1 * | 12/2005 | Minami | 370/352 |
| 2006/0007939 | A1 * | 1/2006 | Elangovan | 370/395.53 |
| 2006/0133811 | A1 * | 6/2006 | Gumaste et al. | 398/83 |
| 2007/0110078 | A1 * | 5/2007 | De Silva et al. | 370/395.53 |

OTHER PUBLICATIONS

"Virtual Bridged Local Area Networks Amendment 4: Provider Bridges", IEEE Standard for Local and metropolitan area networks, IEEE Computer Society, IEEE Std. 802.1ad™-2005, Dec. 7, 2005 pp. 1-60.

* cited by examiner

*Primary Examiner* — Ricky Ngo
*Assistant Examiner* — Clemence Han
(74) *Attorney, Agent, or Firm* — Stites & Harbison, PLLC; Juan Carlos A. Marquez, Esq

(57) ABSTRACT

A passive optical network (PON) system includes at least one optical line terminal (OLT), a plurality of optical network units (ONUs) connected to each OLT, and an OLT management server used to manage the OLT. The OLT management server creates a VLAN access control table in response to a user's request to indicate a VID translation relation among different VLAN identifiers (VIDs) and sends a VID translation relation described in the VLAN access control table to the OLT, and the OLT creates a VLAN translation table indicating a correspondence relation between a source VID and a destination VID, which are waiting for translation, based on the received VID translation relation. If the OLT determines that a VID included in a received frame must be translated based on the VLAN translation table, the OLT references the VLAN translation table to translate the VID included in the received frame to a corresponding destination VID.

9 Claims, 16 Drawing Sheets

FIG. 3

| VPN ID | VID | OLT NUMBER | OLT IP ADDRESS |
|---|---|---|---|
|  | 1 | #1 | 192.168.10.6 |
|  | 2 | #1 | 192.168.10.6 |
|  | 3 | #2 | 192.168.50.2 |
|  | ... | ... | ... |
|  | m | #xx | xxx.xxx.xxx.xxx |

FIG. 4

| VID TRANSLATION TYPE | VPN ID | SERVICE VID | (VID,OLT) | (VID,OLT) | (VID,OLT) |
|---|---|---|---|---|---|
| VLAN COMMUNICATION |  | 100 | (1,1) | (3,2) | ... |
| VLAN ENCAPSULATION |  |  | (2,1) | ... | ... |
| ... | ... | ... | m | n | ... |

FIG. 5

| VID TRANSLATION TYPE | DESTINATION VID | SOURCE VID | SOURCE VID | ------ |
|---|---|---|---|---|
| VLAN COMMUNICATION | 1 | 3 | ------ | ------ |
| VLAN ENCAPSULATION | (100,2) | 2 | ------ | ------ |
| VLAN ENCAPSULATION | 2 | (100,2) | ------ | ------ |

FIG. 6

| INDEX | OLID | ONU MAC ADDRESS | VID | MAC ADDRESS |
|---|---|---|---|---|
| 1 | #1 | 00:00:00:00:00:01 | 1 | aa:aa:aa:aa:aa:aa |
| 2 | #2 | 00:00:00:00:00:02 | 2 | bb:bb:bb:bb:bb:bb |
| ------ | ------ | ------ | ------ | ------ |
| N | 0xxx | xx:xx:xx:xx:xx:xx | n | yy:yy:yy:yy:yy:yy |

FIG. 12

| VPN ID | VID | OLT NUMBER | OLT IP ADDRESS |
|---|---|---|---|
| | 1 | #1 | 192.168.10.6 |
| | 1 | #2 | 192.168.50.2 |
| | | ..... | ..... |

FIG. 13

| VPN ID | SERVICE VID | (VID,OLT) | (VID,OLT) | VID TRANSLATION TYPE | VLAN ENCAPSULATION |
|---|---|---|---|---|---|
| | 100 | (1,1) | (1,2) | | |
| | ..... | ..... | ..... | | |

FIG. 14

| VID TRANSLATION TYPE | DESTINATION VID | SOURCE VID | SOURCE VID | ------ |
|---|---|---|---|---|
| VLAN ENCAPSULATION | (100,1) | 1 | ------ | ------ |
| VLAN ENCAPSULATION | 1 | (100,1) | ------ | ------ |

FIG. 15

| INDEX | OLID | ONU MAC ADDRESS | VID | MAC ADDRESS |
|---|---|---|---|---|
| 1 | #1 | 00:00:00:00:00:01 | 1 | aa:aa:aa:aa:aa:aa |
| | | | | |

FIG. 16

| VID TRANSLATION TYPE | DESTINATION VID | SOURCE VID | SOURCE VID | ------ |
|---|---|---|---|---|
| VLAN ENCAPSULATION | (100,1) | 1 | ------ | ------ |
| VLAN ENCAPSULATION | 1 | (100,1) | ------ | ------ |

FIG. 17

| INDEX | OLID | ONU MAC ADDRESS | VID | MAC ADDRESS |
|---|---|---|---|---|
| 1 | #5 | 00:00:00:00:00:02 | 1 | bb:bb:bb:bb:bb:bb |
| ------ | ------ | ------ | ------ | ------ |

FIG. 20

| VPN ID | VID | OLT NUMBER | OLT IP ADDRESS |
|---|---|---|---|
| VPN#1 | 1 | #1 | 192.168.10.6 |
| VPN#1 | 2 | #2 | 192.168.50.2 |
| ----- | ----- | ----- | ----- |

FIG. 21

| VID TRANSLATION TYPE | VPN ID | SERVICE VID | (VID,OLT) | (VID,OLT) | (VID,OLT) |
|---|---|---|---|---|---|
| VLAN COMMUNICATION | VPN#1 | | (1,1) | (2,2) | ----- |
| ----- | | | | | |

FIG. 22

| VID TRANSLATION TYPE | DESTINATION VID | SOURCE VID | SOURCE VID | ------ |
|---|---|---|---|---|
| VLAN COMMUNICATION | 1 | 2 | ------ | ------ |
| ------ | ------ | ------ | ------ | ------ |

FIG. 23

| INDEX | OLID | ONU MAC ADDRESS | VID | MAC ADDRESS |
|---|---|---|---|---|
| 1 | #1 | 00:00:00:00:00:01 | 1 | aa:aa:aa:aa:aa:aa |
|  |  |  |  |  |

FIG. 24

| VID TRANSLATION TYPE | DESTINATION VID | SOURCE VID | SOURCE VID | ------ |
|---|---|---|---|---|
| VLAN COMMUNICATION | 2 | 1 | ------ | ------ |
| ------ | ------ | ------ | ------ | ------ |

FIG. 25

| INDEX | OLID | ONU MAC ADDRESS | VID | MAC ADDRESS |
|---|---|---|---|---|
| 1 | #5 | 00:00:00:00:00:02 | 2 | bb:bb:bb:bb:bb:bb |
| ------ | ------ | ------ | ------ | ------ |

PASSIVE OPTICAL NETWORK SYSTEM FOR SUPPORTING VIRTUAL ETHERNET SERVICE AND METHOD FOR THE SAME

INCORPORATION BY REFERENCE

The present application claims priority from Chinese application CN200610071069.9 filed on Mar. 31, 2006, the content of which is hereby incorporated by reference into this application.

BACKGROUND OF THE INVENTION

The present invention relates generally to a passive optical network (PON), and more particularly to a passive optical network and a method thereof that support a type of virtual Ethernet LAN (VLAN) services.

Today, a passive optical network based on passivity and optical characteristics, which provides high-speed communication capability at a low-cost, is an ideal high-speed, broadband access technology for the next generation.

In general, a passive optical network system is composed primarily of the following three parts: optical line terminal (OLT), optical distribution network (ODN), and optical network unit (ONU).

FIG. 1 is a diagram showing the concept of a conventional PON system. As shown in FIG. 1, the PON system has a structure in which one point is divided into multiple points. An OLT connected to the core network is installed in the station side. One OLT is connected to multiple ONUs via one or more ODN apparatuses such as optical splitters. The ONU, located in the client's side, is usually installed in the subscriber's home or office and, as necessary, one ONU can be shared by multiple users. In the PON shown in FIG. 1, a downstream frame is transmitted from the OLT to each ONU in the broadcast mode and an upstream frame is transmitted from the ONU to the OLT in the Optical Time Division Multiplexing mode. The PON system having such a network structure can provide the user with various services ranging from the conventional telephones and the Internet services to the IPTV which has recently evolved.

When broadcast frames are sent in the conventional Ethernet network where there are many terminal apparatuses in the network, the broadcast signals use up the bandwidth (broadcast stream), sometimes causing the network function to go down. The concept of a virtual LAN (VLAN) has been widely used to allow a network to satisfy the need of both QoS and network management.

A VLAN, which is created by dividing a large network into multiple logically independent subnets, does not depend on the physical configuration. Each VLAN is though of as one logical sub broadcast area, and the terminals in the area have the same VLAN identifiers (VIDs). Therefore, a broadcast frame sent from a VLAN can be accepted only by a terminal in the same VLAN. Dividing a network into sub broadcast areas, independent to each other, allows a VLAN to conveniently manage the network and, at the same time, to efficiently suppress broadcast streams that may occur in the broadcast mode.

It is very important to provide a PON system with the complete VLAN function because VLANs provide the flexible and safe network management capability.

Conventionally, a PON system that can partially support the VLAN service is already provided. For example, US patent 2005/0083950 titled "Shared LAN emulation method and apparatus having VLAN recognition and LLID management functions on EPON" discloses a PON system that can identify one type of VID. According to the idea disclosed by the invention described above, an OLT assigns a unique logic link ID (LLID), which identifies each ONU or ONU group, to each ONU. When a broadcast frame including a VID is received, the OLT sends the frame to the ONUs having the same VID.

In such a PON system which supports VLANs, communication can made only among the terminals belonging to the same VLAN and, therefore, this system has the two problems given below.

One problem is that a conventional OLT does not support communication among different VLANs. For communication among terminals belonging to different VLANs, the apparatus that manages a VLAN must translate the VID of a data frame from the communication source VLAN to the VID of the communication destination VLAN to allow a terminal in the VLAN described above to receive the data frame. However, the conventional OLT has only the function to identify a VID but does not have the function to automatically translate a VID among VLANs.

In addition, the conventional OLT does not support a service VID that is an extended VID. Although a VID, a 12-bit field, can provide the maximum of 4094 VLANs, a service provider may assign a VID to each subscriber in which case 4094 VIDs are used up immediately. According to the definition of 802.1 Q-in-Q (VLAN encapsulation) presented to IEEE802.1ad, a service provider can distribute one service VID to multiple different VLANs (that is, those VLANs belong to a VLAN identified by one service VID), and the distributed service VID is transmitted in conjunction with the specified fields added to the frame and the VID of VLAN. FIG. 8 shows the fields of the service VID. As shown in FIG. 8, another type field is added between the source MAC address field and the VID type field. The added type field has the same format as that of the VID type field except that the VID field is changed to the service VID field. The use of the service VID allows a service provider to provide 4094*4094 VLANs and thus extend the network service by encapsulated VLANs. However, the conventional OLT can neither add a service VID corresponding to the data frame when an upstream frame is received from an ONU nor identify a service VID in a downstream frame. That is, the conventional OLT cannot support VLAN encapsulation.

To solve both problems with the OLT described above, the system according to the conventional technology has a function corresponding to a switch between the OLT and the core network to allow the switch to achieve the translation function that translates data at communication time between different VLANs as well as the VLAN encapsulation function that adds and identifies a service VID. However, the switch having such functions, which is usually set up manually, requires a complex and inefficient maintenance procedure and thus significantly affects network flexibility.

Therefore, there is a need for a passive optical network (PON) system and method for fully supporting the VLAN service.

SUMMARY OF THE INVENTION

In view of the foregoing, it is an object of the present invention to provide a passive optical network system and its method that support the VLAN services that can be fully managed by an OLT without using a switch.

It is another object of the present invention to provide a passive optical network system and its method that support the VLAN services in which communication among different VLANs can be performed via an OLT.

It is still another object of the present invention to provide a passive optical network system and its method that support the VLAN services in which an OLT supports VLAN encapsulation (Q-in-Q) via a service VID.

To achieve the above objects, the present invention provides an optical line terminal (OLT) that supports virtual LAN (VLAN) services. The OLT, connected to a core network and a plurality of optical network units (ONUs), comprises:

a VLAN translation control unit that receives information on VID translation relations among different VLAN identifiers (VIDs) sent from an OLT management server on the core network and creates a VLAN translation table indicating a correspondence relation between a source VID and a destination VID, which are waiting for translation, based on the VID translation relations;

a storage unit in which the VLAN translation table is saved; and a VLAN processing unit that checks if a VID included in a received frame must be translated based on the VLAN translation table and, if the VID must be translated, references the VLAN translation table to translate the VID included in the received frame to a corresponding destination VID.

To achieve the above objects, the present invention provides an optical line terminal (OLT) management server that supports virtual LAN (VLAN) services. The OLT management server, connected to a plurality of optical line terminals (OLTs) in a PON system, comprises:

a VLAN access control unit that creates a VLAN access control table in response to a user's request to indicate VLAN identifier (VID) translation relations among different VIDs, sends the VID translation relations to OLTs to allow the OLTs to perform VLAN translation based on the VID translation relations; and a storage unit in which the VLAN access control table is saved.

To achieve the above objects, the present invention provides a method that supports virtual LAN (VLAN) services in a PON system. The PON system comprises at least one optical line terminal (OLT), a plurality of optical network units (ONUs) connected to each OLT, and an OLT management server that manages the OLT. The method described above comprises the steps of:

(a) creating, by the OLT management server, a VLAN access control table in response to a user's request to indicate VID translation relations among different VLAN identifiers (VIDs) and sending the VID translation relations, included in the VLAN access control table, to related OLTs;

(b) creating, by the OLT, a VLAN translation table indicating a correspondence relation between a source VID and a destination VID, which are waiting for translation, based on information on the received VID translation relations; and (c) if it is determined that a VID included in a received frame must be translated based on the VLAN translation table, translating, by the OLT, the VID included in the received frame to a corresponding destination VID by referencing the VLAN translation table.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of a VLAN management table in the configuration shown in FIG. 2.

FIG. 4 is a diagram showing an example of a VLAN access control table in the configuration shown in FIG. 2.

FIG. 5 is a diagram showing an example of a VLAN translation table created by OLT#1 based on the access control table shown in FIG. 4.

FIG. 6 is a diagram showing an example of an LLM table created by OLT#1.

FIG. 12 and FIG. 13 are diagrams showing the VLAN management table and the VLAN access control table of the OLT management server in the configuration shown in FIG. 11.

FIG. 14 and FIG. 15 are diagrams showing the VLAN translation table and the LLM table of OLT#1 in the configuration shown in FIG. 11.

FIG. 16 and FIG. 17 are diagrams showing the VLAN translation table and the LLM table of OLT#2 in the configuration shown in FIG. 11.

FIG. 20 and FIG. 21 are diagrams showing the VLAN management table and the VLAN access control table of the OLT management server in the configuration shown in FIG. 19.

FIG. 22 and FIG. 23 are diagrams showing the VLAN translation table and the LLM table of OLT#1 in the configuration shown in FIG. 19.

FIG. 24 and FIG. 25 are diagrams showing the VLAN translation table and the LLM table of OLT#2 in the configuration shown in FIG. 19.

DESCRIPTION OF THE EMBODIMENTS

Embodiments of the present invention will be described with reference to the attached the drawings. To allow an OLT to manage VLANs, the present invention provides a passive optical network system such as the one shown in FIG. 2. Overall, an OLT management server is added to the passive optical network system according to the present invention. Therefore, the VID translation relation is set and updated in response to a user request, and the VID translation relation includes the VLAN communication relation and the correspondence relation between service VIDs and VLANs. The OLT management server sends the VID translation relation to a related OLT. In this way, each OLT creates its own VLAN translation table according to the VID translation relation and translates the VID, included in a received frame, to a destination VID according to the VLAN translation table.

That is, the present invention is composed of the following three stages: a stage in which the OLT management server creates the VID translation relation, a stage in which each OLT creates a VLAN translation table according to the VID translation relation, and a stage in which the OLT performs VLAN translation based on the VLAN translation table. Referring to FIG. 2 to FIG. 9, the following describes the actual flow of the three stages.

Figure 1:
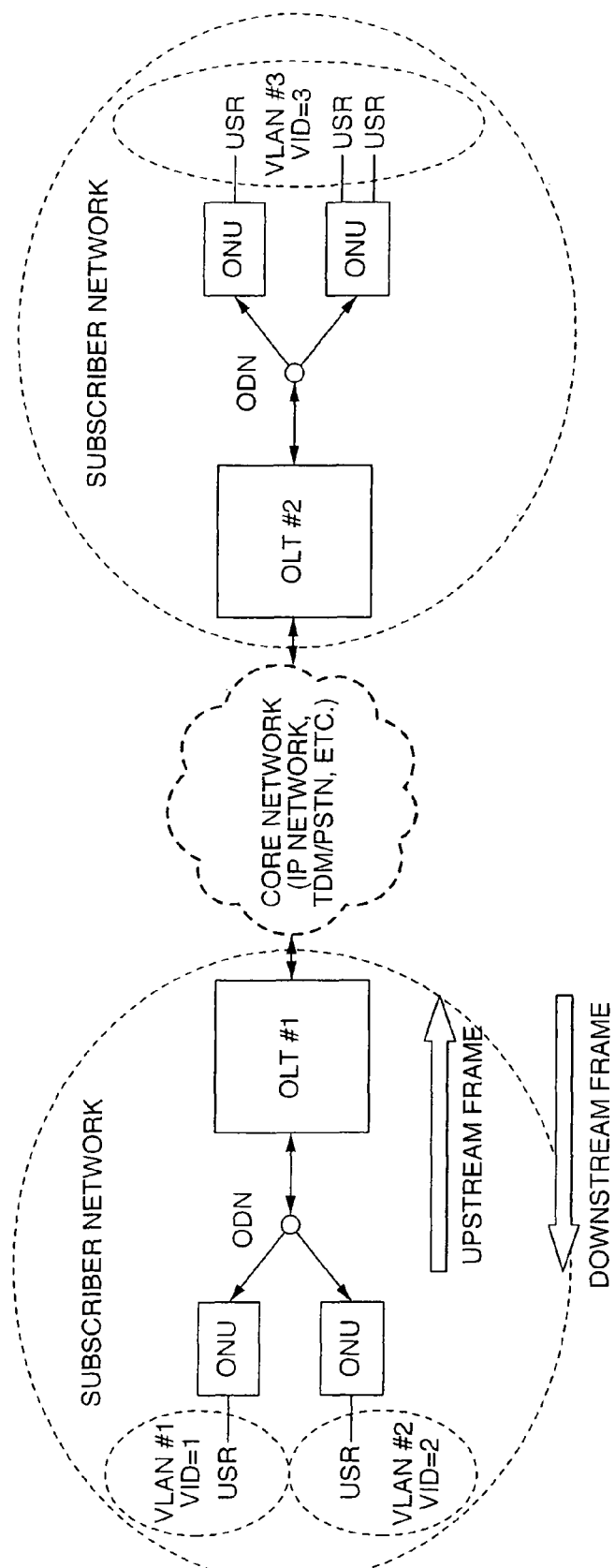
FIG. 1 is a diagram showing the concept of the structure of a conventional passive optical network system.
Figure 2:
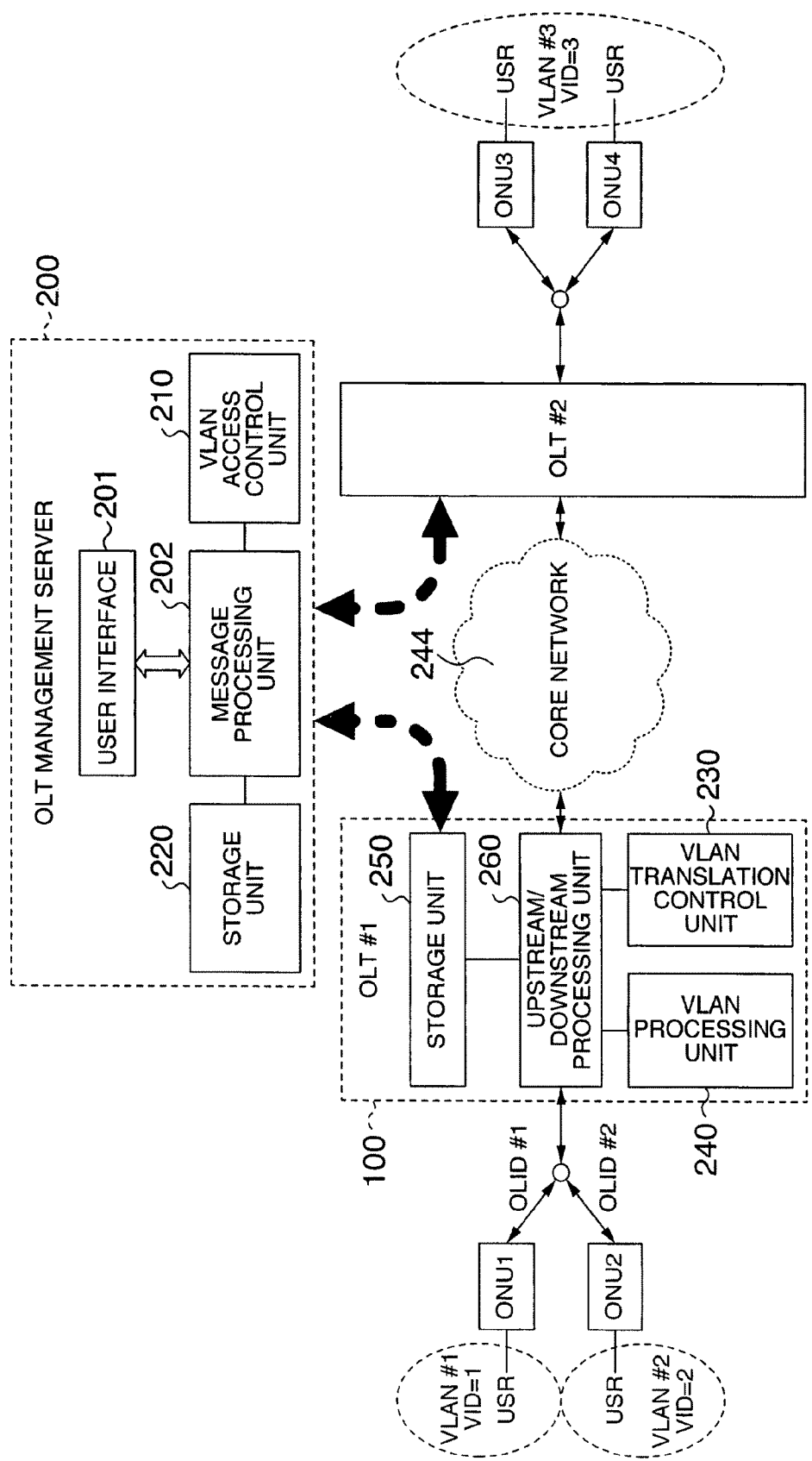
FIG. 2 is a diagram showing the concept of a passive optical network system to which the present invention is applied.

FIG. 2 is a diagram showing the concept of a passive optical network system in an embodiment of the present invention. The passive optical network system can provide the automatic VLAN translation function and the VLAN encapsulation (Q-in-Q) function.

The passive optical network system has the following parts: an OLT management server 200 on a core network 244 and two OLTs 100 (OLT#1 and OLT#2). Each OLT is connected to multiple ONUs each connected to one user. The users of the two ONUs connected to OLT#1 belong to two different VLANs, that is, the user of ONU1 belong to VLAN#1 (VID=1) and the user of ONU2 belong to VLAN#2 (VID=2). On the other hand, the users of the two ONUs connected to OLT#2 both belong to VLAN#3 (VID=3). Note that multiple users sharing the same ONU may belong to different VLANs.

OLT Management Server

As shown in FIG. 2, the OLT management server 200 comprises a user interface 201, a message processing unit 202, a VLAN access control unit 210, and a storage unit 220.

The user interface 201 receives a request (for example, a request to communicate between different VLANs) from a network manager and sends it to the message processing unit 202. The message processing unit 202 receives a request from the user interface 201, processes the request, and sends processed request to the VLAN access control unit 210; or controls the storage unit 220 according to a response received from the VLAN access control unit 210; or sends a related message to each OLT.

The VLAN access control unit 210 creates and allocates a VLAN management table and a VLAN access control table (those tables will be described later in detail) in response to a request from a network manager and saves the VLAN management table and the VLAN access control table into the storage unit 220 via the message processing unit 202. The VLAN access control unit 210 sends the content of the VLAN access control table to a related OLT via the message processing unit 202 to cause the OLT to create or update its VLAN translation table. The message processing unit 202 that processes various messages, an independent part of the message processing unit 202 in this embodiment, may also be integrated into the VLAN access control unit 210.

FIG. 3 and FIG. 4 show an example of the VLAN management table and the VLAN access control table created by the OLT management server 200.

VLAN Management Table

FIG. 3 shows an example of the VLAN management table used in the configuration shown in FIG. 2. The VLAN management table includes the VID that identifies a VLAN group, the number of an OLT to which the VID belongs, and the IP address of the OLT. In addition, the table stores the VPN identifier (VPN ID) when multiple VLANs belong to different virtual private networks (VPN).

As shown in FIG. 2, OLT#1 is connected to VLAN#1 (VID=1) and VLAN#2 (VID=2) and OLT#2 is connected to VLAN#3 (VID=3). Referring to the VLAN management table shown in FIG. 3, VID=1 and VID=2 correspond to OLT#1, and VID=3 corresponds to OLT#2. In this way, the VLAN management table shown in FIG. 3 clearly indicates the belonging relation between VLANs and OLTs. That is, the table indicates which VLAN is in which OLT.

If the VLAN division is relatively stable, the VLAN management table can be directly and manually maintained by a network manager. The network manager can also add a new VLAN as necessary. In this case, to update and manage the VLAN management table immediately, the VLAN access control unit 210 regularly sends a search request to each OLT 100 in the network to request the OLT to send information on the VLAN group which belongs to the OLT. In response to the search request, the OLT 100 sends information on the VLAN group, to which the users connecting to the OLT belong, to the OLT management server 200. In this way, the VLAN access control unit 210 updates the VLAN management table as necessary.

VLAN Access Control Table

When communication is performed between different VLANs or when the system is requested to support the VLAN encapsulation (Q-in-Q) function, the network manager sends a request to create or update a VLAN access control table to the VLAN access control unit 210. The VLAN access control table shows the translation relation among different VIDs. FIG. 4 shows an example of the VLAN access control table used in the configuration shown in FIG. 2.

As shown in FIG. 4, the VLAN access control table includes the following fields.

The VID translation type field includes one of two VID translation types: "VLAN communication" and "VLAN encapsulation". "VLAN communication" means that the VID in a received frame is translated to the VID of the VLAN of a communication destination when communication is performed between different VLANs. "VLAN encapsulation" means that, when a service provider distributes a service VID to a VLAN, the VID of a received frame and the provided service VID are translated between them.

The (VID, OLT) field includes information identifying a VLAN connected to an OLT. This information is based on the information defined in the VLAN management table (see FIG. 3). For example, (1,1) indicates VLAN#1 (VID=1) connected to OLT#1.

The service VID field includes a service VID distributed to a VLAN indicated by (VID, OLT). The VPN ID field is an optional field that stores a VPN ID when the VLAN belongs to a different VPN.

As shown in FIG. 4, the VLAN access control table includes multiple (VID, OLT) columns. When the VID translation type is a VLAN communication, multiple (VID, OLT) entries in the same row indicate that communication can be performed between the VLANs corresponding to those entries. For example, the first row in the table shown in FIG. 4 contains two (VID, OLT) entries, (1,1) and (3,2). This indicates that, in FIG. 2, communication can be performed between VLAN#1 belonging to OLT#1 and VLAN#3 belonging to OLT#2. Therefore, OLT#1 and OLT#2 must translate VID=1 and VID=3 each other. The VID translation type field in the second row of the table shown in FIG. 4 includes "VLAN encapsulation" that corresponds to (2, 1) in the (VID, OLT) field and to 100 in the service VID field. This indicates that the service VID of VLAN#2 belonging to OLT#1 is 100 and its VID is 2. OLT#1 must perform translation based on this entry.

After creating the access control table, the VLAN access control unit 210 of the OLT management server 200 sends the VID translation relation, included in the access control table, to the related OLTs and requests them to update the VLAN translation tables. For example, the VLAN access control unit 210 sends the content of the first row of the table shown in FIG. 4 to OLT#1 and OLT#2, and the content of the second row to OLT#1. The OLTs, which receive the content of the table, perform the corresponding processing according to the VID translation relation that has been received.

OLT

Returning to FIG. 2, a VLAN translation control unit 230, a VLAN processing unit 240, a storage unit 250, and an upstream/downstream processing unit 260 are added to the conventional OLT to perform the method of the present invention.

The upstream/downstream processing unit 260 receives an upstream frame or a downstream frame. The VLAN translation control unit 230 receives the VID translation relation, included in the VLAN access control table, from the OLT management server 200 and creates or updates the VLAN translation table. The VLAN translation control unit 230 must also create a logic link table (LLM) that indicates the mapping relation between the logic link identifier (OLID) of each layer connected to the OLT and a VID. The created VLAN translation table and the LLM table are saved in the storage unit 250. The VLAN processing unit 240 references the VLAN translation table (and also references LLM table as necessary) to check if the VID of a received frame must be translated to a destination VID. If there is such a need, the VLAN processing unit 240 performs the translation function. The detailed workflow of the VLAN processing unit 240 will be described later with reference to FIG. 7.

FIG. 5 and FIG. 6 show an example of the VLAN translation table and the LLM table created by OLT#1 based on the access control table in FIG. 4.

VLAN Translation Table

As shown in FIG. 5, the VLAN translation table created by the VLAN processing unit 240 has the following fields.

Same VID translation type field as that shown in FIG. 4: There are two types, "VLAN communication" and "VLAN encapsulation".

Destination VID type field: Identifies the destination VID when the VID included in a received frame is translated.

Source VID field: Identifies the VID included in a received frame that must be translated.

In each VLAN translation table, one destination VID field may correspond to multiple source VID fields.

The following describes how the VLAN translation control unit 230 creates a VLAN translation table when OLT#1 receives the content of the first row and the second row of the VLAN access control table shown in FIG. 4.

First, the VLAN translation control unit 230 identifies the VID translation type included in the received VLAN access control table. For example, if the received VID translation type is "VLAN communication", the VLAN translation control unit 230 checks the subsequent fields (VID, OLT). The content of the first row of the table shown in FIG. 4 indicates that VLAN#1 (1,1) and VLAN#3 (3,2) communicate with each other. Therefore, the VLAN translation control unit 230 stores the identifier, VID=1, of the VLAN related to this OLT (OLT#1) in the destination VID field of the VLAN translation table and stores the other VID in the source VID field. Then, the source VID field stores 3 as shown in FIG. 5. Once the VLAN translation table is set up in this way, the VLAN processing unit 240 translates the VID of a received downstream frame, whose VID is 3, to VID=1 according to the entries in the VLAN translation table and transmits the data frame from VLAN#3 to VLAN#1.

If the received VID translation type is "VLAN encapsulation", the VLAN translation control unit 230 checks (VID, OLT) corresponding to the subsequent service VID field. The content of the second row of the table shown in FIG. 4 indicates that service VID=100 corresponds to VLAN#2 (2, 1). Therefore, the VLAN translation control unit 230 adds two rows of recording to the VLAN translation table as shown in FIG. 5. In one row, VID=2 is stored in the source VID field and (service VID=100, VID=2) is stored in the destination VID field; in the other row, (service VID=100, VID=2) is stored in the source VID field and VID=2 is stored in the destination VID field. Once the VLAN translation table is set up in this way, the VLAN processing unit 240 adds service VID=100 to a received upstream frame whose VID=2 and deletes service VID=100 from a received downstream frame whose VID=2 based on the entries of the VLAN translation table (The detailed procedure will be described later).

LLM Table

To transmit a received frame correctly to a destination ONU, the VLAN translation control unit 230 creates not only the VLAN translation table but also a logic link table for use by an OLT to search for a VID corresponding to a logic link. FIG. 6 shows an example of the LLM table created by the OLT 100 for managing information on the logical links between ONUs and the OLT. The table includes the following fields.

Layer identifier (OLID): Is used to identify a logic link between an ONU and an OLT such as OLID#1 and OLID#2 shown in FIG. 2. The layer identifier is LLID in an EPON, and a port number in a GPON.

ONU MAC address: Is the MAC address of an ONU registered in OLT.

VID: Indicates a VLAN group to which an ONU or an ONU port belongs.

MAC address: Is the MAC address of each ONU user.

When data is sent in the multicast mode, one OLID corresponds to multiple MAC addresses. The MAC address automatic collection function can collect the MAC addresses corresponding to an OLID.

The detailed operation performed using the LLM table and the VLAN translation table will be described later with reference to FIG. 7.

Flow of VLAN Translation in an OLT

Figure 7:
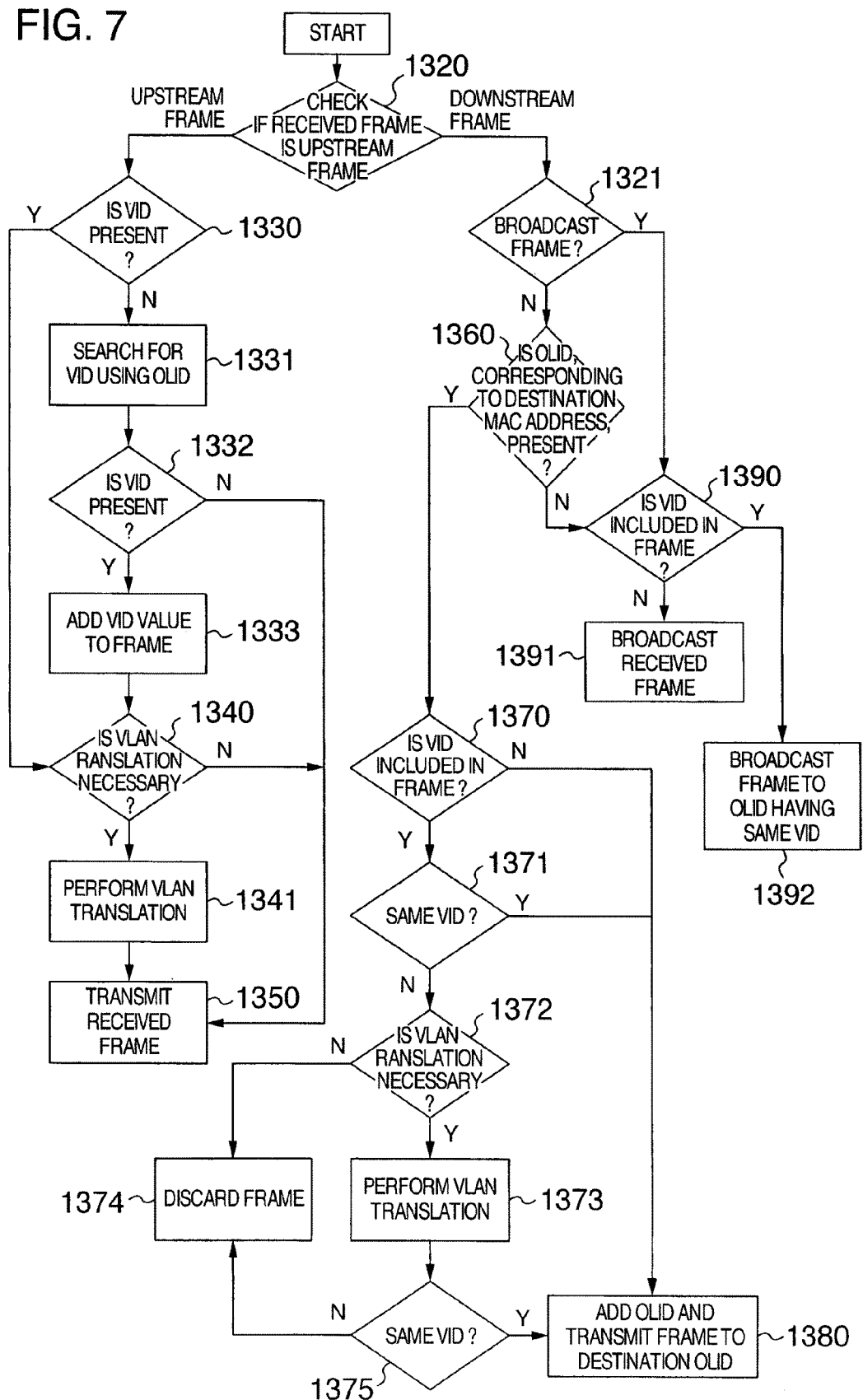
FIG. 7 is a flowchart showing VLAN translation processing performed for an upstream/downstream frame received by the VLAN processing unit of an OLT.

FIG. 7 is a flowchart showing the VLAN translation processing that the VLAN processing unit 240 of an OLT performs for received upstream/downstream frames.

After the OLT receives a data frame, the VLAN processing unit 240 first checks if the data frame is an upstream frame or a downstream frame as shown in FIG. 7 (step 1320).

If the received data frame is an upstream frame, the VLAN processing unit 240 checks if the frame contains a VID value (step 1330). If the received frame is an upstream frame but does not have a VID value, the VLAN processing unit 240 uses OLID included in the frame, shown in FIG. 8, to search the LLM table for a corresponding item (step 1331). If a corresponding item is present and a corresponding VID value is detected (step 1332), the VLAN processing unit 240 adds the VID value to the VID field (12 bits) in the received frame (step 1333). If a corresponding item or a corresponding VID value is not present, the VLAN processing unit 240 directly sends the frame (step 1350).

Figure 8:
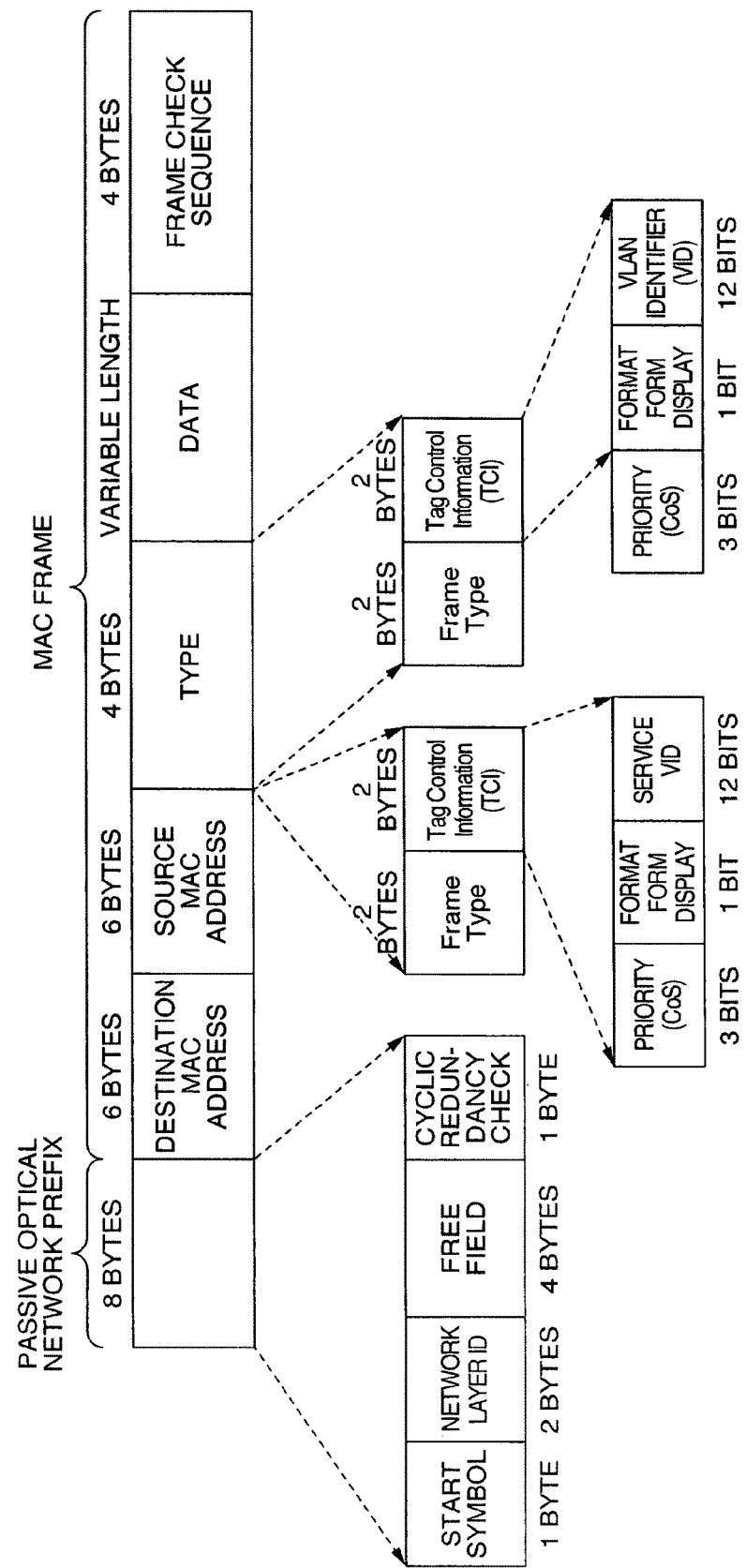
FIG. 8 is a diagram showing the structure of an upstream frame having a service VID field.

If the received frame contains a VID value (step 1330) or a corresponding VID value is added, the VLAN processing unit 240 deletes the passive optical network prefix, shown in FIG. 8, and checks if VLAN translation is necessary (step 1340). The checking procedure is as follows. The VLAN processing unit 240 checks if the VID, included in the received frame, is equal to the value of the source VID field of an item in the VLAN translation table. If such an item is found, the VLAN translation is necessary; otherwise, the VLAN translation is not necessary. If necessary, the VLAN translation is performed (step 1341); otherwise, the frame is directly transmitted (step 1350).

The detailed procedure for the VLAN translation (step 1341) is as follows. The VLAN processing unit 240 checks the VID translation type in the VLAN translation table and, if the VLAN translation type is "VLAN encapsulation", adds the service VID to the frame. That is, the VLAN processing unit 240 adds the value (for example, 100) of the service VID included in the value (for example, (100, 2)) of the corresponding item to the service VID field in the data frame. If the VID translation type is "VLAN communication" type, the VLAN processing unit 240 changes the VID, included in the received frame, to the value of the corresponding destination VID field of the table.

If the received frame is a downstream frame, the VLAN processing unit 240 checks if the frame is a broadcast frame (step 1321). If the frame is a broadcast frame but the VID value is not present (step 1390), the VLAN processing unit 240 directly broadcasts the frame (step 1391). If the frame is a broadcast frame that contains the VID value, the VLAN processing unit 240 broadcasts the frame to an OLID having the same VID (step 1392).

If the received downstream frame is not a broadcast frame, the VLAN processing unit 240 searches the LLM table for the OLID corresponding to the MAC address included in the frame (step 1360). If such an item is not present, the VLAN processing unit 240 processes the frame as a broadcast frame. If such an item is present, the VLAN processing unit 240 searches the frame for a VID (step 1370). If no VID is present, the VLAN processing unit 240 adds the OLID directly to the passive optical network prefix and transmits the frame to the destination OLID (step 1380). If a VID is present, the VLAN processing unit 240 checks if the VID is the same as the VID included in the LLM table (step 1371). If they are the same, the VLAN processing unit 240 transmits the frame to the ONU corresponding to the OLID (step 1380). If they are not the same, the VLAN processing unit 240 checks if the VLAN translation is necessary (step 1372). The VLAN processing unit 240 performs the VLAN translation (step 1373) if the VLAN translation is necessary, but directly discards the frame if the VLAN translation is not necessary (step 1374).

The following describes the detailed processing procedure. If the frame contains the service VID, the VLAN processing unit 240 compares (service VID, VID value in VID field) with the source VID of an item in the VLAN translation table and, if a match occurs, deletes the service VID. If the frame does not contain the service VID, the VLAN processing unit 240 checks the source VID in the VLAN translation table. If there is a source VID whose value is the same as that in the VID field of the frame, the VLAN processing unit 240 changes the VID in the frame to the VID corresponding to the table; otherwise, the VLAN processing unit 240 discards the frame.

All processes of the passive optical network system supporting the VLAN service according to the present invention have been described with reference to FIGS. 2-7, from the creation of the VLAN access control table to the completion of the VLAN processing.

Automatic VLAN Translation Relation Creation

Figure 9:
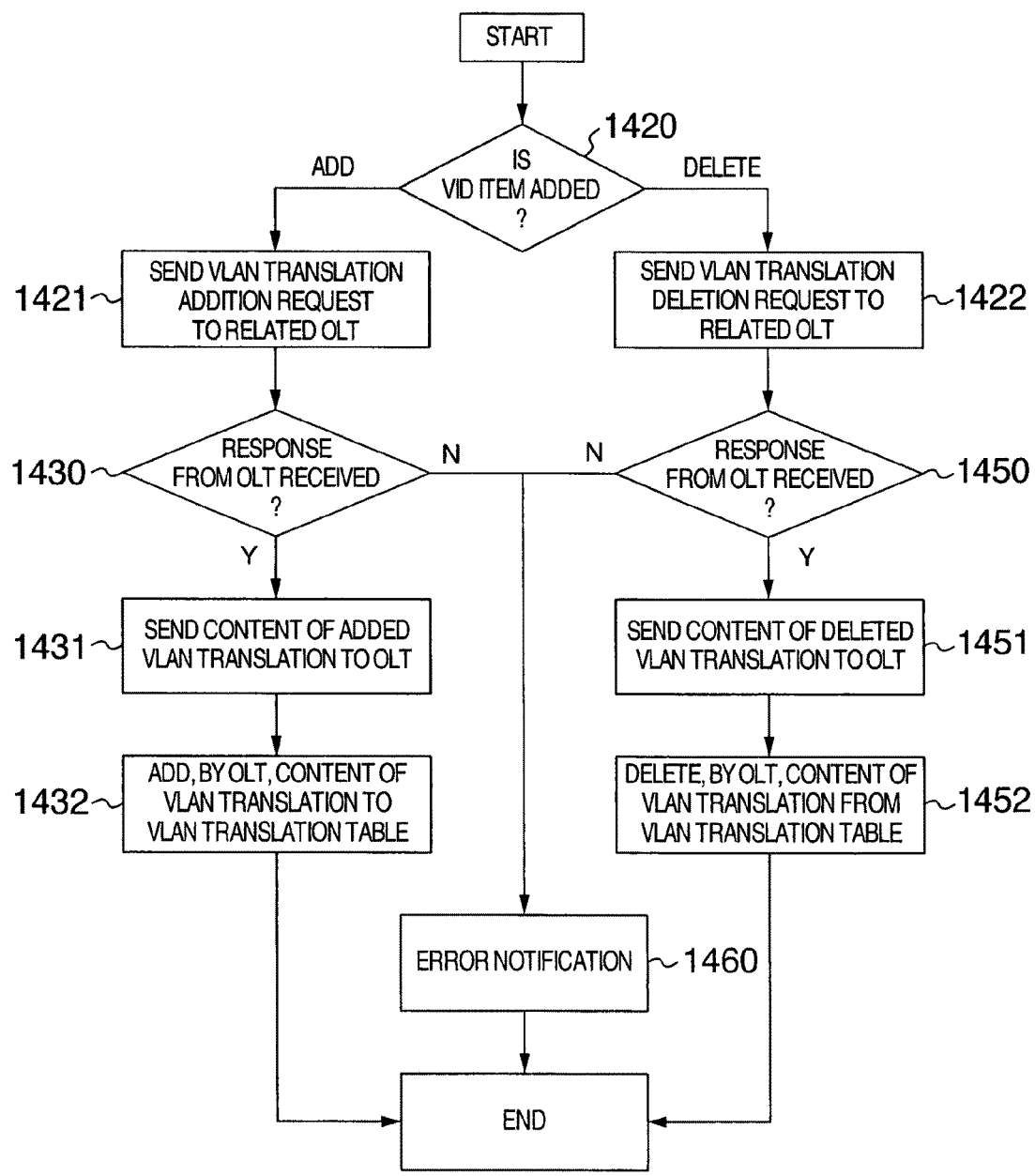
FIG. 9 and FIG. 10 are a flowchart showing automatic VLAN translation processing and a diagram showing the transfer of information respectively.
Figure 10:
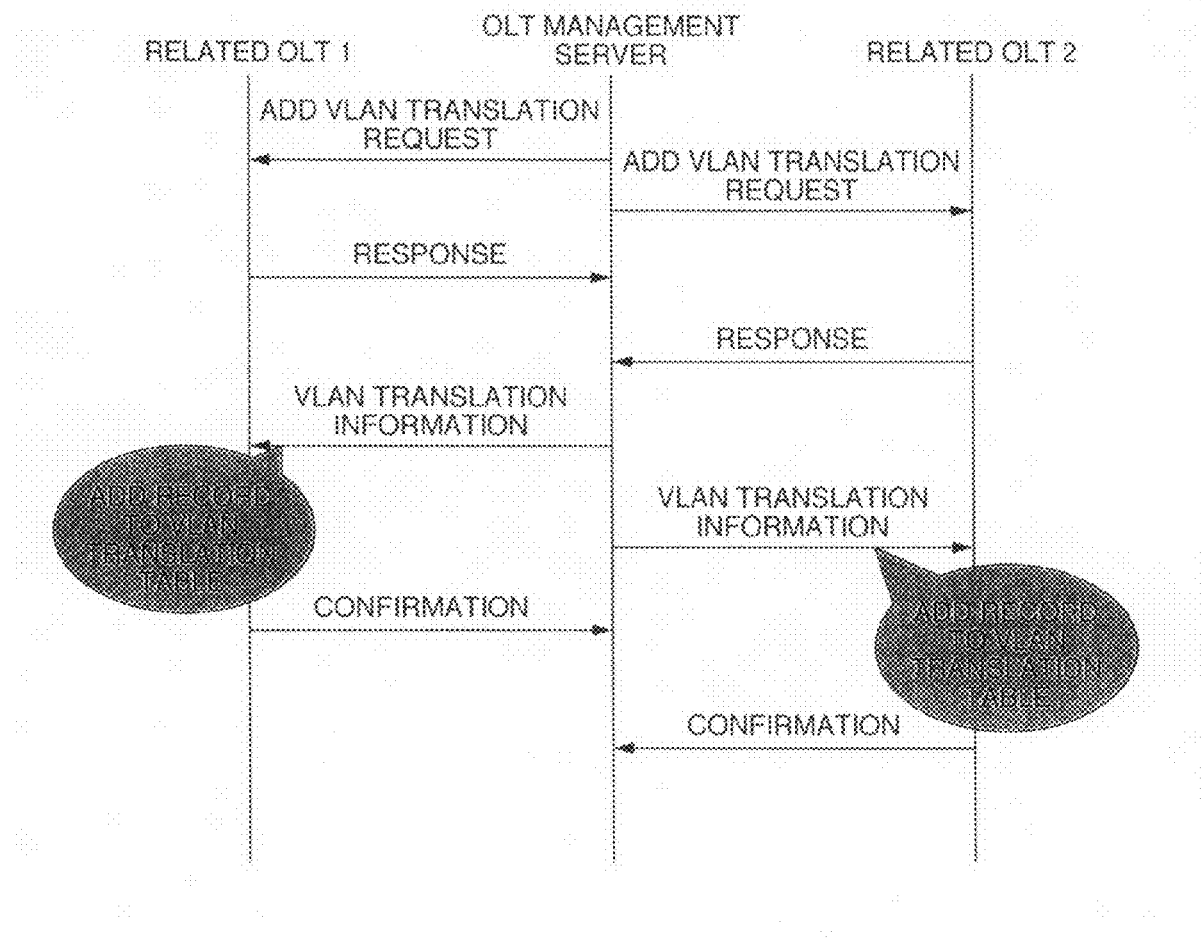

When a service provider distributes a service VID to a VLAN or when communication must be performed between different VLANs, the network manager creates a new VID translation relation. When the service provider cancels the service VID of a VLAN or inhibits the communication between different VLANs, the network manager deletes the related VID translation relation. FIG. 9 shows the procedure for the automatic update (including the addition and deletion of a VID translation relation) of VLAN entries. FIG. 10 shows the transfer of information between the OLT management server and an OLT when the automatic update is performed.

As shown in FIG. 9, the OLT management server first checks if a VID translation item is added to, or deleted from, the VLAN access control table (step 1420).

When a VID translation item is added, the OLT management server sends a VLAN translation addition request to the OLT indicated by (VID, OLT) of the added item (step 1421). If the VLAN translation function is supported, the OLT sends a confirmation message to the OLT management server (step 1430). Upon receiving this confirmation message, the OLT management server sends the content of the added VID translation item to the OLT (step 1431) and, in response, the OLT updates the VLAN translation table (step 1432) and, after the update, sends the update confirmation message to the OLT management server to indicate that the update has been performed. If the OLT management server does not receive the confirmation message, an error notification is issued (step 1460).

The OLT updates the VLAN translation table according to the following procedure.

If the VID translation type of the added VID translation item is "VLAN encapsulation", the OLT adds two records to the VLAN translation table for the VID included in the translation item and related to this OLT. One is added to translate an upstream frame for adding the corresponding service VID, and the other is added to translate a downstream frame for deleting the corresponding service VID.

If the VID translation type of the added VID translation item is "VLAN communication", the OLT adds one record to the VLAN translation table for the VID included in the translation item and related to this OLT. The value of the destination VID field of the VLAN translation table is set to the VID related to this OLT, and the value of the source VID field is set to the value of the VID included in the VID translation item other than the destination VID.

When a VID translation item is deleted (step 1420), the OLT management server sends a VLAN translation deletion request to the OLT indicated by the (VID, OLT) of the deleted item (step 1422). When the VLAN translation function is supported, the OLT sends a confirmation message to the OLT management server (step 1450). Upon receiving this confirmation message, the OLT management server sends the content of the deleted VID translation item to the OLT (step 1451) and the OLT deletes the corresponding item from the VLAN translation table (step 1452). If the OLT management server does not receive the confirmation message, an error notification is issued (step 1460).

The OLT deletes a VLAN translation table item according to the following procedure.

If the VID translation type of the deleted VID translation item is "VLAN encapsulation", the OLT deletes the item included in the VLAN translation table and related to the service VID of the VID translation item.

If the VID translation type of the deleted VID translation item is "VLAN communication", the OLT deletes the item included in the VLAN translation table and related to the VID communication of the VID translation item.

All processes of the method according to the present invention have been described with reference to FIG. 2 to FIG. 10.

Next, the following further describes the characteristics of the present invention using two embodiments.

First Embodiment

VLAN Encapsulation

Figure 11:
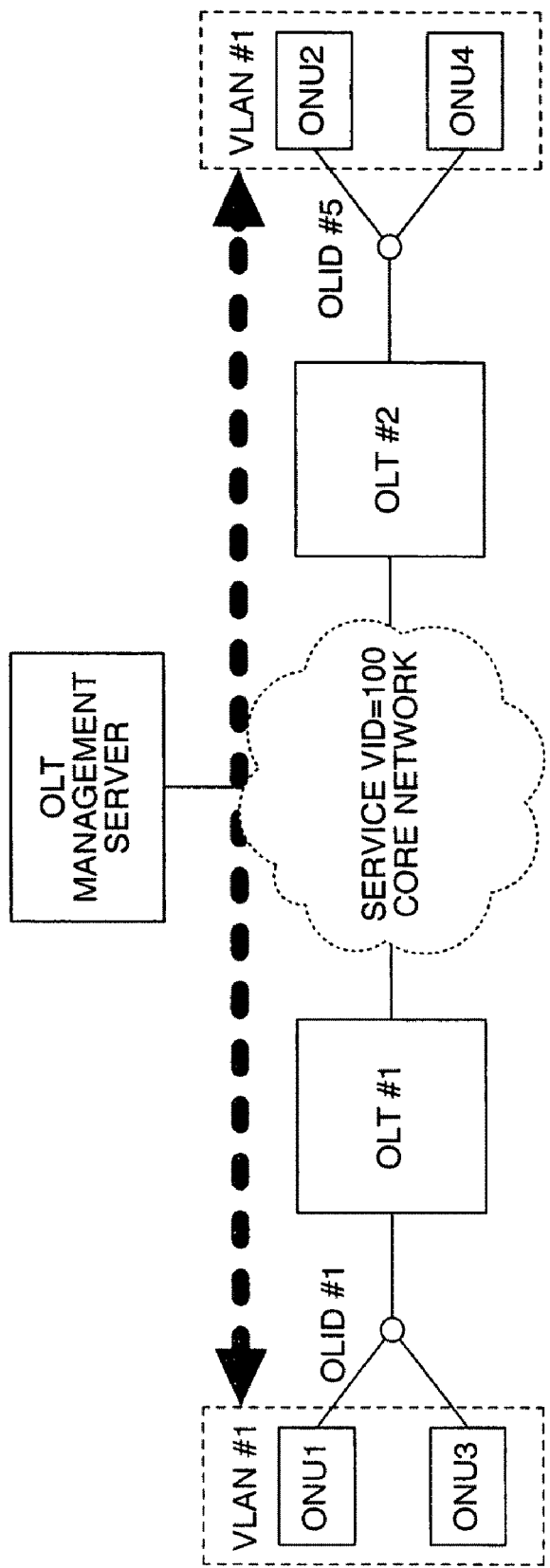
FIG. 11 is a diagram showing the distribution of a service VID to a VLAN to which the present invention is applied.

FIG. 11 shows how ONU1 and ONU2 communicate with each other when the service provider distributes a service VID to VLAN#1. As shown in FIG. 11, ONU1 and ONU2, connected respectively to OLT#1 and OLT#2, belong to the same VLAN#1 (VID=1). The service provider distributes service VID=100 to VLAN#1. In this case, the OLT management server creates the VLAN management table (such as the one shown in FIG. 12) and the VLAN access control table (such as the one shown in FIG. 13) according to the method described above and sends the content of the first row of the VLAN access control table to OLT#1 and OLT#2, respectively.

OLT#1 and OLT#2 update their VLAN translation tables in response to a VID translation relation from the OLT management server, and the updated VLAN translation tables are as shown in FIG. 14 and FIG. 16. Because ONU1 and ONU2 belong to the same VALN#1, both VLAN translation tables are the same. OLT#1 and OLT#2 create the LLM tables respectively that are shown in FIG. 15 and FIG. 17.

Figure 18:
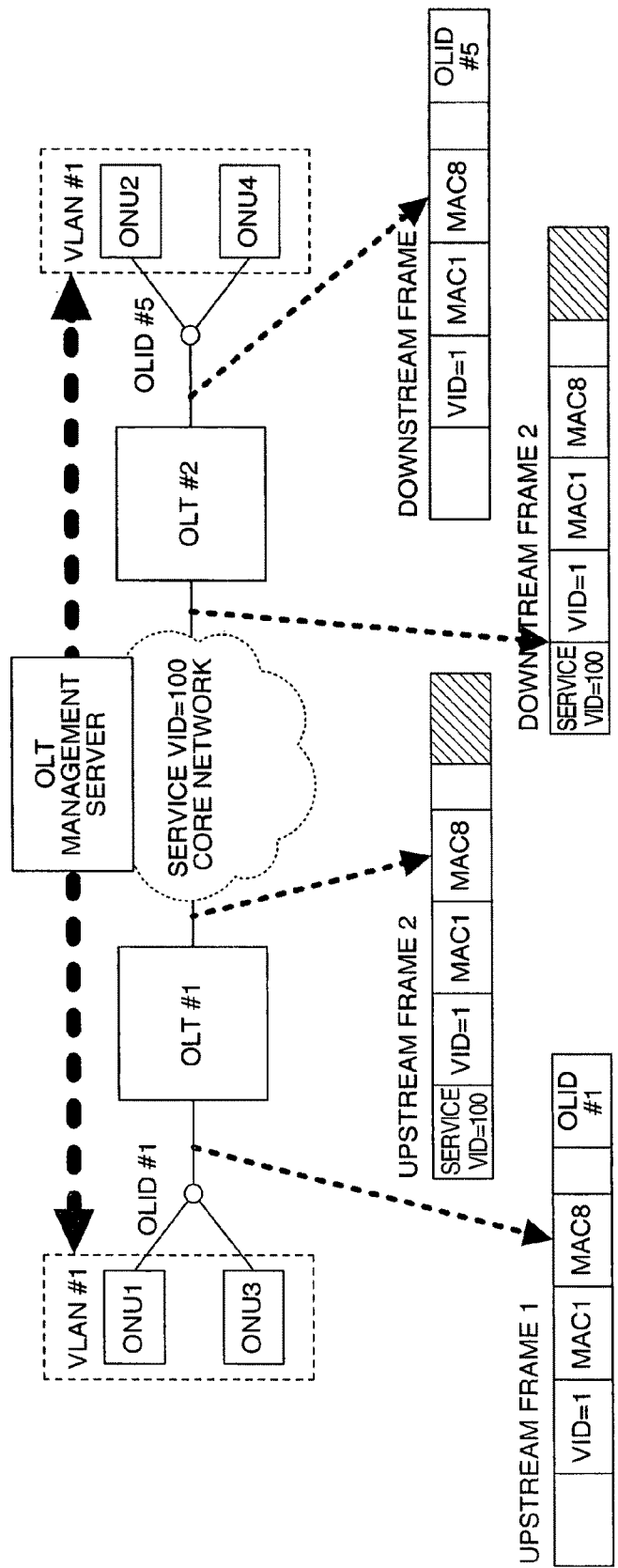
FIG. 18 is a diagram showing how the VIDs of an upstream frame and a downstream frame change in the configuration shown in FIG. 11.

FIG. 18 shows how an upstream frame and a downstream frame are changed in OLT#1 and OLT#2 after the VLAN translation tables are updated. OLT#1 perform the method described above as follows. That is, after receiving an upstream frame 1 including VID=1, OLT#1 adds the service VID=100 to the upstream frame 1 based on the VLAN translation table (such as the one shown in FIG. 14) and deletes the PON prefix including the OLID to change the upstream frame 1 to the upstream frame 2 shown in FIG. 18, and sends an upstream frame 2 to the core network. OLT#2 performs the method according to the present invention as follows. That is, after receiving a downstream frame 2 including the service VID=100 and VID=1, OLT#2 deletes the value of the service VID field based on the VLAN translation table (such as the one shown in FIG. 16), detects OLID#5 corresponding to the destination MAC included in the received frame using the LLM table (FIG. 17), adds the detected OLID#5 to the PON prefix to change the frame to a downstream frame 1, and sends the frame to the corresponding ONU2.

Second Embodiment

VLAN Communication

Figure 19:
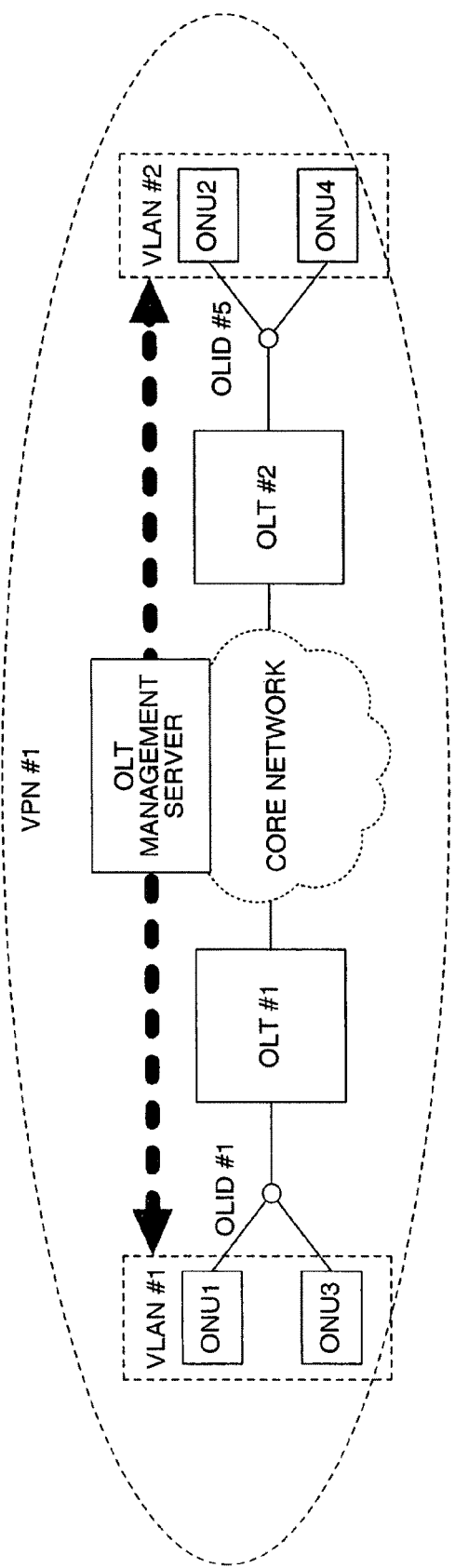
FIG. 19 is a diagram showing communication between two VLANs to which the present invention is applied.

FIG. 19 shows how ONU1 in VLAN#1 and ONU2 in VLAN#2 communicate with each other. As shown in FIG. 19, ONU1 and ONU2, connected respectively to OLT#1 and OLT#2, belong to VLAN#1 (VID=1) and VLAN#2 (VID=2). In this case, the OLT management server creates the VLAN management table (such as the one shown in FIG. 20) and the VLAN access control table (such as the one shown in FIG. 21) according to the method described above and sends the content of the first row of the VLAN access control table to OLT#1 and OLT#2, respectively.

OLT#1 and OLT#2 update their VLAN translation tables in response to a VID translation relation from the OLT management server, and the updated VLAN translation tables are as shown in FIG. 22 and FIG. 24. In this case, because the VLAN translation table is created under the principle that the VLAN translation is performed only for a downstream frame, the destination VID and the source VID are reversed in both VLAN translation tables. As shown in FIG. 23 and FIG. 25, OLT#1 and OLT#2 create the LLM tables respectively. The LLM tables are similar to those in the first embodiment except VID corresponding to ONU2 is 2 (VID=2).

Figure 26:
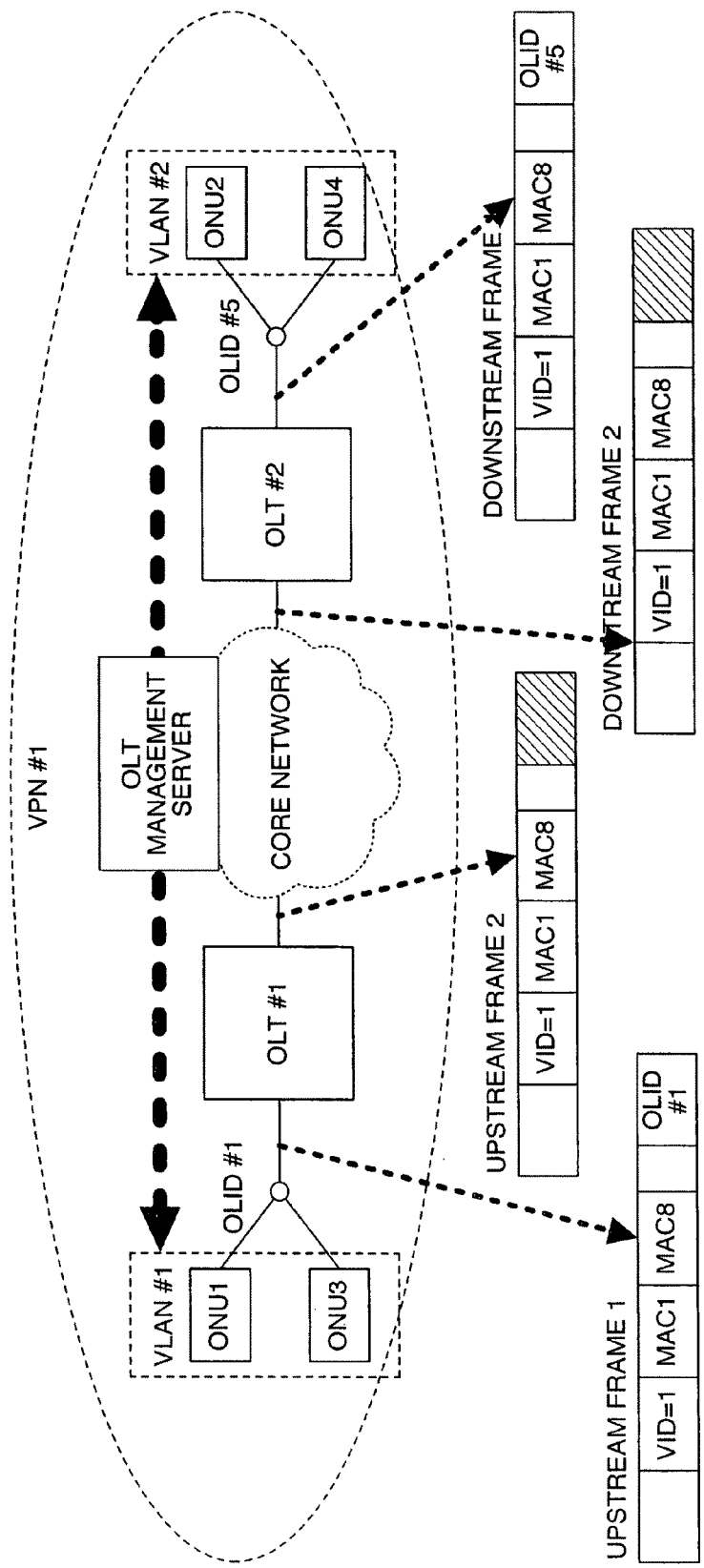
FIG. 26 is a diagram showing how the VIDs of an upstream frame and a downstream frame change in the configuration shown in FIG. 19.

FIG. 26 shows how an upstream frame and a downstream frame are changed in OLT#1 and OLT#2 after the VLAN translation tables are updated. OLT#1 performs the method described above as follows. That is, after receiving an upstream frame 1 including VID=1, OLT#1 directly transmits the upstream frame because the corresponding source VID is not found in the VLAN translation table (such as the one shown in FIG. 22). Therefore, the upstream frame 1, which has passed through OLT#1 shown in FIG. 26, and an upstream frame 2 are exactly the same. Upon receiving a downstream frame including VID=1, OLT#2 searches the LLM table (FIG. 25) for the VID of OLID#5 corresponding to the destination MAC in the received frame and finds that the VID that has been searched for is 2 that is different from the VID included in the received frame. OLT#2 changes the VID in the downstream frame 2 to 2, which is the value of the destination VID field in the VLAN translation table, based on the VLAN translation table (FIG. 24). In addition, OLT#2 adds OLT#5 to the PON prefix, changes the frame to a downstream frame 1 shown in FIG. 26, and sends it to ONU2.

The present invention has been described with reference to the two embodiments above. Although the OLT management server creates the VLAN management table to send information to the related OLTs in the embodiments described above, the VLAN management table is not always necessary in the present invention because the relation information may also be sent to the OLTs in the broadcast mode. Although the VLAN translation is performed only for a downstream frame in the communication among different VLANs in the embodiment, the present invention is not limited to this method but the VLAN translation may also be performed for an upstream frame as necessary.

The passive optical network system and its method for supporting the VLAN service according to the present invention have been described using the detailed embodiments. In the present invention, one OLT management server is added to the passive optical network system, the VLAN access control table including VLAN communication relations and VLAN encapsulation (Q-in-Q) relations is created and updated, and VID translation relations included in the VLAN access control table are notified to the OLTs. In addition, the VLAN translation control unit and the VLAN processing unit are added to an OLT to receive a VID translation relation, to implement the VLAN translation function, and to perform the VLAN translation for a received frame.

Therefore, the system according to the present invention allows an OLT to support a service VID distributed by a service provider for communication among different VLAN groups. An OLT creates a VLAN translation table based on a VID translation relation sent from the OLT management server to ensure the automatic update, easy implementation, and high efficiency of the whole system. The OLT management server in the present invention sends VID translation relations only to the related OLTs based on the VLAN management table, thus reducing the amount of control information transmitted in the system. The idea of the present invention to perform the VLAN translation only for a downstream frame during the communication among different VLANs decreases the complexity of the VLAN translation. In addition, an OLT according to the present invention creates the LLM table, used as the standard, to reflect the correspondence between OLIDs and VIDs to make the VLAN translation easy and speedy.

Finally, it should be understood that the foregoing description of the embodiments is all exemplary but is not restrictive. The scope of the present invention is indicated, not by the above embodiments, but by the claims. In addition, the scope of the present invention includes the meaning equivalent to the scope of the claims as well as all changes in the scope.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical line terminal (OLT), connected to a core network and a plurality of optical network units (ONUs), for supporting virtual LAN (VLAN) services, said OLT comprising:
a VLAN translation control unit that creates a VLAN translation table indicating information on VLAN identifier (VID) translation relations among VIDs to show a correspondence relation between a source VID and a destination VID, which are waiting for translation, based on the VID translation relations, said information on VID translation relations among VIDS being sent from an OLT management server on the core network;
a storage unit in which the VLAN translation table is saved; and
a VLAN processing unit that checks if a VID included in a received frame must be translated based on the VLAN translation table and, if the VID must be translated, references the VLAN translation table to translate the VID included in the received frame to a corresponding destination VID,
wherein said VLAN processing unit searches the VLAN translation table for the VID of the received frame and, if the VID of the received frame is the same as a source VID in the VLAN translation table, determines that the VID of the received frame must be translated,
wherein the VID translation relations include a VLAN communication relation that indicates a correspondence relation between the VIDs of VLANs wishing to communicate with each other,
wherein said VLAN translation control unit sets, based on the VLAN communication relation, the VID of the VLAN belonging to the OLT included in the VLAN communication relation to the destination VID in the VLAN translation table, and another VID corresponding to the destination VID described in the VLAN communication relation to the source VID, whereby VID translation is performed only for a received downstream frame if necessary,
wherein said VLAN translation control unit is also used to create a logic link table (LLM) that includes an optical logic link identifier (OLID) identifying an ONU or an ONU port connected to the OLT, a VID of a VLAN belonging to the OLID, and an MAC address of a user of the OLT, said LLM table indicating a mapping relation among the OLID, the VID, and the user MAC address, and
wherein said VLAN processing unit searches the LLM table for a an item including the same destination MAC address included in the received frame and, if the VID of the detected item is not the same as the VID included in the received frame, determines that the VID of the received frame must be translated.

2. The OLT according to one of claim 1 wherein the VID translation relations include a VLAN encapsulation relation that indicates a correspondence relation between a service VID, distributed to at least one VLAN by a service provider, and the VID of the VLAN.

3. The OLT according to claim 2 wherein
said VLAN translation control unit creates an item, in which a VID and (service VID, VID) are the source VID and the destination VID, and an item, in which (service VID, VID) and a VID are the source VID and the destination VID, in the VLAN translation table based on the VLAN encapsulation relation and
if the received frame is an upstream frame and the VID included in the received frame must be translated, said VLAN processing unit adds the service VID included in the destination VID to a service VID field of the received frame based on the VLAN translation table and, if the received frame is a downstream frame and the VID included in the received frame must be translated, said VLAN processing unit deletes a service VID included in the service VID field of the received frame.

4. The OLT according to claim 3 wherein
said VLAN translation control unit receives a search request from said OLT management server and returns VID information on a VLAN, belonging to the OLT, to said OLT management server as response information.

5. The OLT according to claim 4 wherein said VLAN translation control unit receives a changed VID translation item from said OLT management server and, in response to the received VID translation item, changes the item included in the VLAN translation table.

6. An optical line terminal (OLT) management server, connected to a plurality of optical line terminals (OLTs) in a passive optical network (PON) system, for supporting virtual LAN (VLAN) services, said OLT management server comprising:
a VLAN access control unit that creates a VLAN access control table in response to a user's request to indicate VLAN identifier (VID) translation relations among VIDs, sends the VID translation relations to related OLTs to allow the OLTs to perform VLAN translation based on the VID translation relations; and
a storage unit in which the VLAN access control table is saved, and
wherein the VID translation relations include a VLAN communication relation that indicates a correspondence relation between the VIDs of VLANs wishing to communicate with each other or a VLAN encapsulation relation that indicates a correspondence relation between a service VID, distributed to at least one VLAN by a service provider, and the VID of the VLAN,
wherein said VLAN access control unit creates a VLAN management table to indicate a belonging relation between VLANs and OLTs and sends the VID translation relations to related OLTs,
wherein said VLAN access control unit periodically searches the OLTs and updates the VLAN management table in response to response information from the OLTs, said response information being VID information on VLANs belonging to the OLTs, and
wherein when a VID translation item in the VLAN access control table is corrected in response to a user's request, said VLAN access control unit sends the corrected VID translation item to the OLT related to the item.

7. A passive optical network (PON) system that comprises at least one optical line terminal (OLT), a plurality of optical network units (ONUs) connected to each OLT, and an OLT management server that manages said OLT, said PON system supporting virtual LAN (VLAN) services, said PON system comprising:
the OLT management server and the OLT,
wherein the OLT management server comprises:
a VLAN access control unit that creates a VLAN access control table in response to a user's request to indicate VID translation relations among different VLAN identifiers (VIDs) and sends the VID translation relations to related OLTs; and
a storage unit in which the VLAN access control table is saved; and wherein the OLT comprises:
a VLAN translation control unit that creates a VLAN translation table indicating a correspondence relation between a source VID and a destination VID, which are waiting for translation, in response to information on the VID translation relations;
a storage unit in which the VLAN translation table is saved; and
a VLAN processing unit that checks if a VID included in a received frame must be translated based on the VLAN translation table and, if the VID must be translated, references the VLAN translation table to translate the VID included in the received frame to a corresponding destination VID, and
wherein said VLAN translation control unit also creates a logic link table (LLM) that includes an optical logic link identifier (OLID) identifying an ONU or an ONU port connected to the OLT, a VID of a VLAN belonging to the OLID, and a MAC address of a user of the OLT, said LLM table indicating a mapping relation among the OLID, the VID of the VLAN belonging to the OLID, and the user MAC address, and
wherein said VLAN processing unit searches the LLM table for an item including a MAC address corresponding to a destination MAC address included in the received frame and, if a VID of the item is not the same as the VID included in the received frame, determines that the VID of the received frame must be translated.

8. The system according to claim 7 wherein
the VID translation relations include a VLAN communication relation that indicates a correspondence relation between the VIDs of VLANs wishing to communicate with each other and a VLAN encapsulation relation that indicates a correspondence relation between a service VID, distributed to at least one VLAN by a service provider, and the VID of the VLAN.

9. A method for supporting virtual LAN (VLAN) services in a PON system that comprises at least one optical line terminal (OLT), a plurality of optical network units (ONUs) connected to each OLT, and an OLT management server that manages said OLT, said method comprising the steps of:
creating, by said OLT management server, a VLAN access control table in response to a user's request to indicate VID translation relations among different VLAN identifiers (VIDs) and sending the VID translation relations to related OLTs;
creating, by said OLT, a VLAN translation table indicating a correspondence relation between a source VID and a destination VID, which are waiting for translation, based on information on the received VID translation relations;
creating, by the OLT, a logic link table (LLM) that includes an optical logic link identifier (OLID) identifying an ONU or an ONU port connected to the OLT, a VID of a VLAN belonging to the OLID, and a MAC address of a user of the OLT, said LLM table indicating a mapping relation among the OLID, the VID of the VLAN belonging to the OLID, and the user MAC address;
searching, by the OLT, the LLM table for an item including a MAC address corresponding to a destination MAC address included in the received frame and, if a VID of the item is not the same as the VID included in the received frame, determining that the VID of the received frame must be translated; and
if it is determined that a VID included in a received frame must be translated based on the VLAN translation table, translating, by said OLT, the VID included in the received frame to a corresponding destination VID by referencing the VLAN translation table.

* * * * *